(12) United States Patent
Van den Kieboom

(10) Patent No.: US 6,272,792 B1
(45) Date of Patent: Aug. 14, 2001

(54) COMBINATION FLORAL PRODUCT AND DISPLAY CONTAINER ALL-IN-ONE DIRECT IMPRINT BASE UNIT

(76) Inventor: Jan M. Van den Kieboom, 9023 Glenwood Dr., Greendale, WI (US) 53129

( * ) Notice: Subject to any disclaimer, the term of this patent is extended or adjusted under 35 U.S.C. 154(b) by 0 days.

(21) Appl. No.: 09/336,980

(22) Filed: Jun. 21, 1999

Related U.S. Application Data

(60) Provisional application No. 60/090,210, filed on Jun. 22, 1998.

(51) Int. Cl.[7] .......................................................... A01G 9/02
(52) U.S. Cl. ............................................... 47/84; 47/32
(58) Field of Search ............................................ 47/32, 84

(56) References Cited

U.S. PATENT DOCUMENTS

| | | | | |
|---|---|---|---|---|
| 2,079,116 | * | 5/1937 | Gardner | 47/84 |
| 2,290,117 | * | 7/1942 | Mulford | 47/84 |
| 2,340,373 | * | 2/1944 | Gardner | 47/84 |
| 2,797,041 | * | 6/1957 | Rondone | 47/84 |
| 3,035,751 | * | 5/1962 | Brown | 47/84 |
| 4,400,910 | * | 8/1983 | Koudstaal et al. | 47/84 |
| 4,662,107 | * | 5/1987 | Van Den Kieboom | 47/84 |
| 4,863,015 | * | 9/1989 | Toltzman | 47/84 |
| 5,029,708 | * | 7/1991 | Alonso et al. | 47/84 |
| 5,332,610 | * | 7/1994 | Weder et al. | 47/72 |

* cited by examiner

*Primary Examiner*—Peter M. Poon
*Assistant Examiner*—Kevin Jakel
(74) *Attorney, Agent, or Firm*—Andrus, Sceales, Starke & Sawall, LLP

(57) ABSTRACT

A hollow, bottomless container for shipping and displaying plants. The container is formed of an elongate, rectangular strip of a resilient material that is folded into a triangular sleeve in which a seed ball is placed. The container is formed such that pressure exerted by the seed ball on the side walls of the container does not cause the container to open, but serves to hold the seed ball within the container, negating the need for a bottom surface on the container. The container may also include printed matter on the exterior of the container, as the resilient strip forming the container is also printable.

14 Claims, 1 Drawing Sheet

COMBINATION FLORAL PRODUCT AND DISPLAY CONTAINER ALL-IN-ONE DIRECT IMPRINT BASE UNIT

CROSS-REFERENCE TO RELATED APPLICATION

This application is based on and claims priority from Provisional Application Serial No. 60/090,210 filed Jun. 22, 1998.

FIELD OF THE INVENTION

The present invention is directed to a combination shipping and display container for various types of plants, including flowering plants, and more specifically is directed to an inexpensive, hollow, bottomless container used to ship and display seed balls containing plants of the above-mentioned types formed of an elongate strip of a printable material.

BACKGROUND OF THE INVENTION

As flowers and plants are often sent to individuals for various reasons, such as birthdays and anniversaries, it is necessary to place the plants within a container that protects the plants during shipment. In many cases, the plant to be shipped includes a seed ball. The seed ball is formed of an amount of soil bound about the roots of the plant by a breathable material, such as a piece of burlap. The seed ball enables the plant to survive the time period during which the plant is in transit.

In order to protect the seed ball during shipment, the seed ball is positioned within a container suitable for enclosing and preventing damage to the seed ball. Normally, these containers take the form of rigid flower pots that are used to display the plant after delivery as well as to protect the plant during shipment. However, due to the weight of a flower pot, containers of this type significantly increase the overall weight of the plant to be shipped. This increases the cost of shipping the plants to a point where the cost of sending a plant to someone becomes undesirably expensive.

Therefore, it is desirable to develop a container for the shipment of a plant including a seed ball that is lightweight, but able to protect the seed ball during shipment, and that also may be used as an attractive display container for the plant after the delivery of the plant.

SUMMARY OF THE INVENTION

It is an object of the present invention to provide a shipping container for a plant that is lightweight in order to reduce the shipping costs normally associated with the shipment of plants.

It is another object of the invention to provide a container for the shipment of a plant which may also be used as an attractive display for the plant once delivered.

It is still another object of the invention to provide a container which is very inexpensive to manufacture, enabling a further reduction in the costs of shipping the plant.

The present invention is a hollow, bottomless shipping and display container for a seed ball. The container is comprised of a single strip of a resilient, printable material that includes a number of longitudinal wall sections extending substantially the length of the strip that are separated by fold lines positioned perpendicularly to the wall sections. The wall sections are folded about a first supporting wall section at one end of the strip to form a container of the desired shape. The strip also includes a closure tab disposed opposite the supporting wall section. When folded about an adjacent fold line, the tab engages the exterior surface of one wall section forming the container and enables the container to retain its shape when stressed, such as when a seed ball is positioned in the container, in order to frictionally grip the object in the container.

Furthermore, as the strip is formed of a resilient, printable material, each wall section of the support may also contain printed matter on the exterior surface of the wall section, enabling the container to provide a message or advertisement.

DETAILED DESCRIPTION OF THE DRAWINGS

Figure 1:
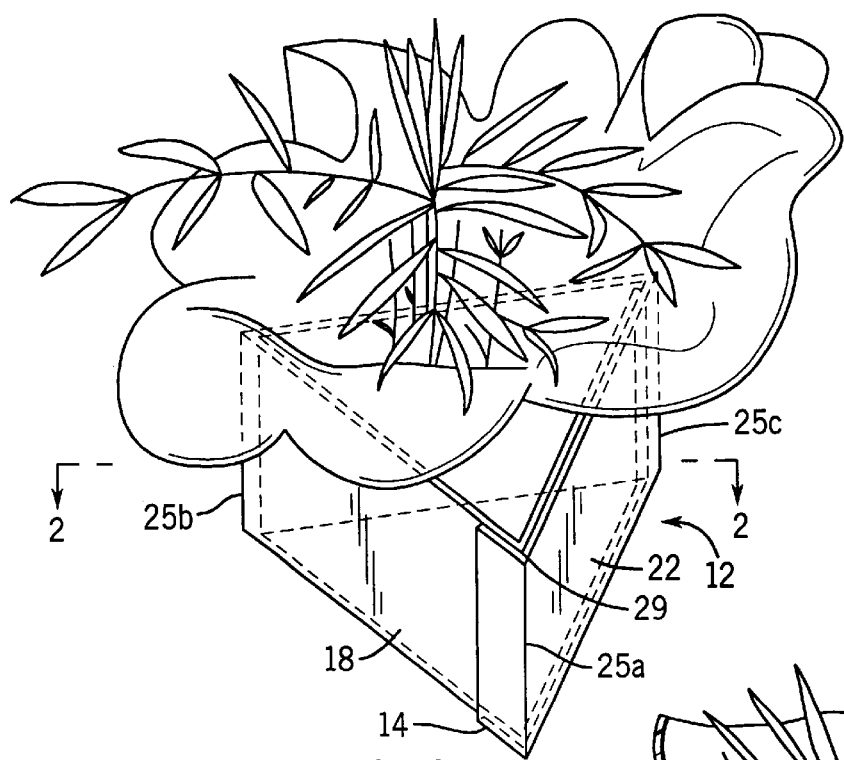
FIG. 1 is an isometric view of the container formed according to the present invention in which a seed ball is positioned.

With reference now to the drawing figures in which like reference numerals designate like parts throughout the disclosure, a hollow, bottomless container indicated generally at 12 is illustrated in FIG. 1. The container 12 holds a seed ball 11, is formed of a single elongate, rectangular strip, and is generally triangular in shape. The strip includes a closure tab 14 at one end, a supporting wall section 16 opposite the closure tab 14, and three side wall sections 18, 20, and 22 disposed between the tab 14 and supporting wall section 16.

Figure 3:
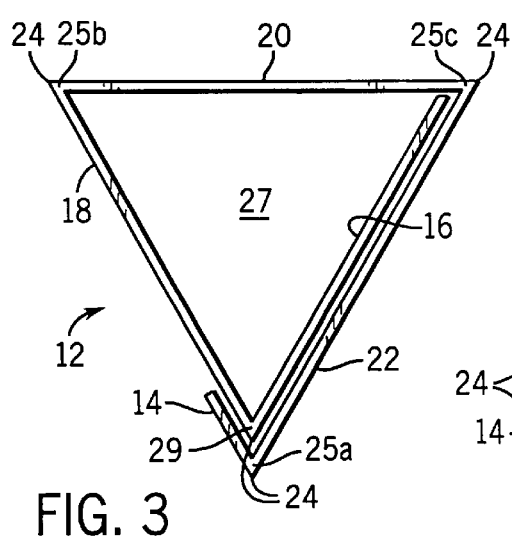
FIG. 3 is a top plan view of the container of FIG. 1.

Looking now at FIGS. 1 and 3, between each section of the strip is located a fold line 24. The fold lines 24 enable each section of the strip to flex with respect to adjacent sections and form the triangular configuration of the support 12. When forming the support 12, the strip is folded or crimped first about the fold line 24 between the supporting wall section 16 and side wall section 18. As seen in FIG. 3, the remaining side wall sections 20 and 22 are also folded or crimped about their respective fold lines 24 to form a hollow triangular container 12 about wall section 16 with corners 25a, 25b and 25c. The container 12 has the supporting wall section 16 positioned parallel to the side wall section 22 along the interior of the container 12 and defines a passage 27 extending completely through the container. The angles formed by the side wall sections in the corners of the container 12 are acute angles of less than 90°, and are preferably about 60°.

For the container 12 to retain this shape, the closure tab 14 is then folded or crimped about the adjacent fold line 24 to extend parallel to the side wall section 18. When folded in this manner, the closure tab 14 engages the corner 25a formed by side wall section 18 and support wall section 16 by forming an outer corner 29 with side wall section 22 approximately equal in shape to the corner 25a. In this configuration, the tab 14 and corner 29 prevent side wall section 22 from disengaging from the supporting wall section 16 and thus opening the container.

Figure 2:
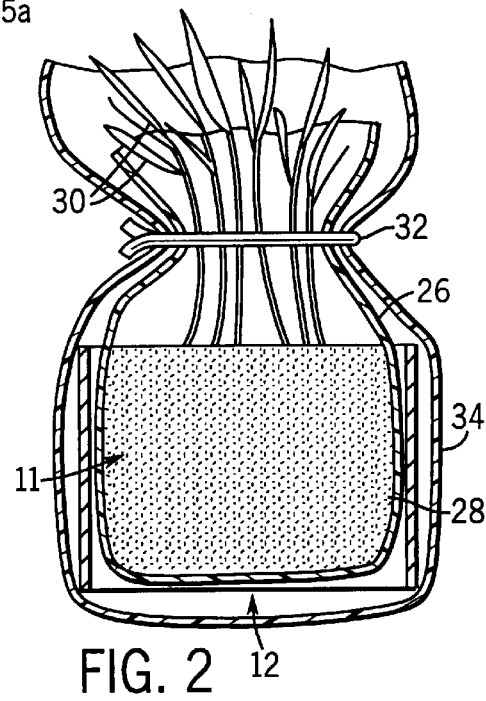
FIG. 2 is a cross-sectional view along line 2—2 of FIG. 1.

After folding the respective sections of the strip into the arrangement of the container shown in FIGS. 1 and 2, the seed ball 11 may be positioned within the passage 27 of container 12. The seed ball 11 includes a bag 26 which surrounds an amount of soil 28 in which a number of plants 30 are disposed. The bag 26 is secured about the soil 28 and the roots of the plants 30 by a fastener 32 releasably secured around the bag 26 and soil 28. Furthermore, as shown in FIG. 2, when the container is used to ship the seed bulb 11, both the container and seed ball may be enclosed within a water-resistant enclosure 34 to further protect the container 10 and the seed ball 11 during shipment.

When placed within the container 12, the seed ball 11 frictionally contacts the interior surfaces of each wall section 16, 18 and 20 to retain the seed ball 11 within the container. The amount of friction generated by the contact between the seed ball 11 and the wall sections is sufficient to counteract the force of gravity acting on the seed ball 11 and maintain the seed ball 11 within the container. When pressure is applied to the support wall section 16 or another side wall section by the seed ball 11 placed in the interior of the container 12, due to the acute angle formed by the closure tab 14 and the interior position of support wall section 16, the tab 14 and the support wall section 16 cooperate to retain the container 12 in the proper shape and in contact with the seed ball 11 without having to otherwise secure the tab 14 to the container 12. The container 12 is kept in constant contact with the seed ball 11 as, when pressure is applied to an interior surface of a wall section, the corner 25 is urged into contact with the outer corner 29 due to the rigidity of tab 14 and the interaction of the supporting wall section 16 with adjacent wall sections to transfer the pressure to the tab 14 and corner 29.

When using the container 12 to display the plant 30 upon delivery as shown in FIG. 1, the enclosure 34 is removed from about the container 12 and seed ball 11, and the fastener 32 is removed from the bag 26. The exposed end of the bag 26 is pressed outwardly to contact the upper edge of the container 12 and to expose the plants in seed ball 11. The contact between the bag 26 and the upper end of the container 12 generates additional frictional forces which aid in retaining the seed ball 11 within the container 12.

Figure 4:
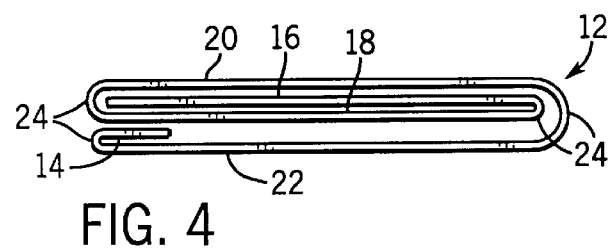
FIG. 4 is a side plan view of a compressed, folded arrangement of the container of FIG. 3.

To form the container 12 of the present invention, first a roll of the resilient, printable material used to form the container 12 continuously passes through a printing machine which prints the desired markings on one surface of the material. The material is then cut in a conventional manner into strips of a specified length. After being cut, the strips are then folded or crimped utilizing a suitable machine, or by hand, to form the fold lines 24 between each section of the strip. After the fold lines 24 are formed in the strip, the strip may be folded to form the container 12, or may be compressed into the arrangement shown in FIG. 4 for shipment to the location where they will be used to form the containers 12 for shipment of seed balls 11.

I claim:

1. In combination:
   a seed ball for a plant, the seed ball including a soil retaining enclosure and an amount of soil contained within the enclosure; and
   a one-piece, hollow, bottomless shipping and display container for enclosing the seed ball, the container being formed of an elongate rectangular strip, the strip including a supporting wall section at first end, a closure tab at a second end, and at least three connected side wall sections disposed between the first and second ends, each of the sections having substantially the same size and shape and being separated by fold lines in the strip, the strip being foldable about the fold lines in order to engage the tab with the side wall sections and form the container, the supporting wall section lying parallel with, adjacent to and inside a first side wall section and the closure tab lying parallel with, adjacent to and outside a second side wall section, the container being constructed and arranged such that the seed ball enclosure is frictionally engageable with the supporting wall section, the second wall section and a third wall section in a manner so that the seed ball hangs from the interior of the container.

2. The combination of claim 1 wherein the strip forms a triangular support.

3. The combination of claim 2 wherein the interior supporting wall section is approximately the same length as the side wall sections.

4. The combination of claim 3 wherein the closure tab is less than one-third the length of a side wall section.

5. The combination of claim 2 wherein the strip is formed of a resilient, thermoplastic material.

6. The combination of claim 5 wherein the strip includes printed matter on one side of the side wall sections.

7. The combination of claim 2 wherein the enclosure is formed of a decorative paper.

8. The combination of claim 7 wherein the container and seed ball are positionable within a water-resistant bag during shipment.

9. A hollow, bottomless container for shipping and displaying a seed ball for a plant, the seed ball including an enclosure containing an amount of soil, the container comprising:
   an elongate, rectangular strip of a resilient, thermoplastic material including a supporting wall section forming one end of the strip, a closure tab forming the other end of the strip, a number of connected side wall sections disposed between the ends, and fold lines disposed between each of the sections, wherein the sections have substantially the same size and shape, and are folded about the fold lines to engage the tab with the side wall sections and form the hollow container, the supporting wall section lying parallel with, adjacent to and inside one side wall section, and the closure tab lying parallel with, adjacent to and outside another side wall section, the container being sized such that the seed ball enclosure is frictionally engageable with and suspended from the supporting wall section and at least two side wall sections.

10. The container of claim 9 wherein the strip includes three side wall sections and forms a triangular support.

11. The container of claim 10 wherein the supporting wall section is approximately the same length as a side wall section.

12. The container of claim 11 wherein the closure tab section is less than one-third the length of a side wall section.

13. The container of claim 12 wherein each side wall section includes printed material disposed on one surface of the side wall sections.

14. A hollow, bottomless container for shipping and displaying a seed ball for a plant, the seed ball including an enclosure containing an amount of soil, the container comprising:
   an elongate, rectangular strip defining a triangular tube, the strip including a supporting wall section at a first end, a closure tab at a second end, and first, second and third connected wall sections disposed between the first and second ends, each of the wall sections having substantially the same size and shape having supporting upper ends and being separated by fold lines in order to engage the tab with the side wall sections and form the container, the container being constructed and arranged such that the seed ball rests on the upper ends of and frictionally engages the wall sections so that the seed ball hangs inside the triangular tube.

* * * * *